US012771954B2

(12) United States Patent
Shum et al.

(10) Patent No.: US 12,771,954 B2
(45) Date of Patent: Oct. 20, 2026

(54) SYSTEMS AND METHODS FOR RELAYING A MESSAGE FOR A PHYSICAL LEVEL/DATA LINK LEVEL COMMUNICATION PROTOCOL

(71) Applicant: Cirrus Logic International Semiconductor Ltd., Edinburgh (GB)

(72) Inventors: Wai-Shun Shum, Austin, TX (US); Amar Vellanki, Cedar Park, TX (US); Jeffrey Skarzynski, Austin, TX (US); Gautham S. Sivasankar, Austin, TX (US); Xingdong Dai, Austin, TX (US); Venugopal Choukinishi, Austin, TX (US); Xiaofan Fei, Austin, TX (US); Xin Zhao, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 113 days.

(21) Appl. No.: 18/318,896

(22) Filed: May 17, 2023

(65) Prior Publication Data

US 2023/0379592 A1 Nov. 23, 2023

Related U.S. Application Data

(60) Provisional application No. 63/344,763, filed on May 23, 2022.

(51) Int. Cl.

*H04N 23/90* (2023.01)
*G06F 13/38* (2006.01)

(Continued)

(52) U.S. Cl.

CPC ........... *H04N 23/90* (2023.01); *G06F 13/387* (2013.01); *G06F 13/4022* (2013.01); *G06F 13/4247* (2013.01)

(58) Field of Classification Search

CPC ... H04L 1/18; H04L 12/66; H04L 1/08; H04L 2001/0097; H04L 45/00; H04L 25/20;

(Continued)

(56) References Cited

U.S. PATENT DOCUMENTS 7,334,068 B2 * 2/2008 Huff ........................ H04L 43/00 710/33
7,769,046 B1 * 8/2010 Crocker .................. H04L 45/28 370/469

(Continued)

FOREIGN PATENT DOCUMENTS

WO 2013038554 A1 3/2013

OTHER PUBLICATIONS

International Search Report and Written Opinion of the International Searching Authority, International Application No. PCT/US2023/022658, mailed Aug. 10, 2023.

*Primary Examiner* — Faisal M Zaman
(74) *Attorney, Agent, or Firm* — Jackson Walker L.L.P.

(57) ABSTRACT

A system for relaying communication for a PHY/data link level communication protocol may include a first device having a first and second transceiver, the first transceiver having a first protocol controller configured to detect a first bus condition and second transceiver having a second protocol controller configured to detect a second bus condition and a switching matrix coupled to the first and second transceiver and configured to operate in a relaying mode to enable: the first protocol controller to control a physical layer of the second transceiver and enables the second protocol controller to control a physical layer of the first transceiver, a physical layer of a first transmitter of the first transceiver to receive an output of a second receiver of the second transceiver, and the physical layer of a second (Continued)

transmitter of the second transceiver to receive an output of a first receiver of the first transceiver.

12 Claims, 6 Drawing Sheets

(51) Int. Cl.
*G06F 13/40* (2006.01)
*G06F 13/42* (2006.01)

(58) Field of Classification Search
CPC ... H04N 23/90; G06F 13/387; G06F 13/4022; G06F 13/4247
See application file for complete search history.

(56) References Cited

U.S. PATENT DOCUMENTS

| | | | | |
|---|---|---|---|---|
| 8,699,514 | B2 * | 4/2014 | Huff | H04L 12/40169 370/465 |
| 9,197,339 | B2 * | 11/2015 | Jonkman | H04L 12/28 |
| 10,211,881 | B2 * | 2/2019 | Wang | H04B 3/32 |
| 11,108,590 | B2 * | 8/2021 | Armbruster | H04L 12/437 |
| 2003/0179709 | A1 * | 9/2003 | Huff | H04L 9/40 370/282 |
| 2004/0071389 | A1 * | 4/2004 | Hofmeister | H04B 10/40 385/16 |
| 2005/0050205 | A1 * | 3/2005 | Gordy | G06F 13/387 709/227 |
| 2007/0165663 | A1 * | 7/2007 | Aloni | H04L 41/12 370/420 |
| 2008/0165795 | A1 * | 7/2008 | Baruch | H04L 49/9094 370/421 |
| 2009/0316718 | A1 * | 12/2009 | Traeber | H04L 12/40136 370/463 |
| 2011/0026411 | A1 * | 2/2011 | Hao | H04L 12/40189 370/249 |
| 2012/0236869 | A1 * | 9/2012 | Julien | H04L 45/02 370/400 |
| 2017/0320569 | A1 * | 11/2017 | Gordon | B60L 53/80 |
| 2018/0047225 | A1 * | 2/2018 | Batcheller | G07C 5/008 |
| 2021/0320886 | A1 * | 10/2021 | Kasichainula | G06F 13/385 |
| 2022/0050800 | A1 * | 2/2022 | Kim | G06F 13/4022 |
| 2022/0104120 | A1 * | 3/2022 | Ackermann | H04L 1/0025 |
| 2024/0397566 | A1 * | 11/2024 | Chen | H04W 4/80 |

* cited by examiner

SYSTEMS AND METHODS FOR RELAYING A MESSAGE FOR A PHYSICAL LEVEL/DATA LINK LEVEL COMMUNICATION PROTOCOL

RELATED APPLICATION

The present application claims priority to U.S. Provisional Patent Application No. 63/344,763 filed May 23, 2022, which is incorporated by reference herein in its entirety.

FIELD OF DISCLOSURE

The present disclosure relates in general to circuits for electronic devices, including without limitation personal portable devices such as wireless telephones and media players, and more specifically, systems and methods for relating a message for a physical level/data link level communication protocol.

BACKGROUND

Many mobile devices (e.g., mobile phones) include one or more cameras for capturing images. To provide for image stabilization and focus, a position of a camera within a plane substantially parallel to a subject of an image as well as a position of a lens of the camera in a direction perpendicular to such plane, may be controlled by a plurality of motors under the control of a camera controller. A control system may be implemented using an applications processor of the mobile device coupled via a communication interface (e.g., an Inter-Integrated Circuit or I2C interface) to a camera controller local to the camera and its various motors. For example, the applications processor may communicate to the camera controller a vector of data regarding a target position for an applications processor, whereas the camera controller may communicate to the applications processor a vector regarding an actual position of the camera, as sensed by a plurality of magnetic sensors (e.g., Hall sensors) and/or other appropriate sensors.

As mobile devices become more sophisticated, so too is camera control on such mobile devices. Accordingly, camera controllers are increasingly being implemented using multicore processors that may include, on a single integrated circuit, a plurality of processing cores and a plurality of peripheral blocks. A multicore implementation may enable improved system performance (e.g., more operations per clock cycle) and/or may enable execution of processing cores at a lower clock frequency. In addition to use in camera controllers, multicore processors find use in other computation-intensive applications. In addition, camera controllers may also be implemented using multiple processing cores spread over a plurality of integrated circuits.

FIG. 1 illustrates a block diagram of selected components of an example communications system 1, as is known in the art. Such communications system 1 may be used in some applications for camera control. As shown in FIG. 1, communications system 1 may have a system controller 2, device controllers 4 and 6, and multiple target devices 8. As shown in FIG. 1, device controllers 4 and 6 may also be target devices. As also depicted, each of system controller 2, device controllers 4 and 6, and target devices 8 may have one or more PHYs 10. As known in the art, a PHY is an electronic circuit, usually implemented as an integrated circuit, configured to implement physical layer functions of the Open Systems Interconnection (OSI) model in a network interface controller or other device. A PHY may couple a link layer device (often called MAC as an acronym for medium access control) to a physical medium such as an optical fiber or copper cable.

In the example of FIG. 1, system controller 2 may not have direct access to target device 8, and it may require a device controller (e.g., system target+device controller 4) to bridge the original data packet to the desired target device 8 (e.g., to target devices 8 labeled as "device target #1" and "device target #2"). Some applications may have multiple layers of the device controller (e.g., System Target+Device Controller 4 and Device Target #5+Device Controller) before the system controller reaches target devices 8 (e.g., to target devices 8 labeled as "device target #3" and "device target #4").

In order for most protocols to relay a message, the data is first received by the receiver and stored in a memory, the data is unpacked, a next destination is identified, and the data is repacked and forwarded to the next destination until it reaches the final destination. This data process is relatively power-hungry and introduces additional latency. For a system that does not have a processor, special memory mapping may be required, and, depending on the architecture, the memory mapping may get more complex when the number of relay nodes increases.

One example use of a communications system such as that shown in FIG. 1 may be camera image stability application. Due to physical constraints, it may not be possible to fit all of the sensors of a camera control system in a centralized location. In some specific scenarios, a device such as a sensor may only need to interact with a device controller in normal operation where it may be physically distributed in multiple locations that are not close to each other. However, for some purposes, it may be desirable to have a system controller to access the sensor directly. If there are multiple layers of device controllers, the data will need to be processed through all of the device controllers.

Many communication relay designs comprise more than two transceivers, an engine or processor, and memory to handle data packets. FIG. 2 illustrates the same system 1 as in FIG. 1, with additional detail depicting each device controller 4 and 6 having a processor 12 (shown as a microcontroller unit or "MCU") and a memory 14. FIG. 3 illustrates selected components of a device controller 4 or 6. As an example, as shown in FIGS. 2 and 3, data sent from system controller 2 to target device 8 labeled as "Device Target #3" may need to be processed using processor 12 and memory 14 of transceiver 16A of system target+device controller 4 and processor 12 and memory 14 of transceiver 16B of device target+device controller 6. Data coming from data bus 18A may be received by transceiver 16A operating as a receiver (RX). Such data may be stored by a controller 22 of transceiver 16A into a memory 24 of transceiver 16A. Transceiver 16A may then operate as a transmitter (TX) to send the data to transceiver 16B. Transceiver 16B may operate as a receiver (RX) to receive the data, and processor 22 of transceiver 16B may store the data into memory 24 of transceiver 16B. Transceiver 16B may operate as a transmitter (TX) by having processor 22 of transceiver 16B retrieve, extract, and unpack the data from the memory 24 of transceiver 16B and then respectively pack and send the data to data bus 18B. Such process for transmitting data introduces substantial processing and transiting latency.

SUMMARY

In accordance with the teachings of the present disclosure, certain disadvantages and problems associated with existing approaches to managing access to system peripherals in multicore systems may be reduced or eliminated.

In accordance with embodiments of the present disclosure, a system for relaying communication for a PHY/data link level communication protocol may include a first device having a first transceiver and a second transceiver, wherein the first transceiver has a first protocol controller configured to detect a first bus condition and the second transceiver has a second protocol controller configured to detect a second bus condition and a switching matrix coupled to the first transceiver and the second transceiver and configured to operate in a plurality of modes including at least a relaying mode in which the switching matrix enables the first protocol controller to control a physical layer of the second transceiver and enables the second protocol controller to control a physical layer of the first transceiver, enables a physical layer of a first transmitter of the first transceiver to receive an output of a second receiver of the second transceiver, and enables the physical layer of a second transmitter of the second transceiver to receive an output of a first receiver of the first transceiver.

In accordance with these and embodiments of the present disclosure, a method for relaying communication for a PHY/data link level communication protocol may include operating a switching matrix coupled to a first transceiver and a second transceiver of a first device in a plurality of modes including at least a relaying mode in which the switching matrix enables a first protocol controller, which is configured to detect a first bus condition, to control a physical layer of the second transceiver and enables the second protocol controller, which is configured to detect a first bus condition, to control a physical layer of the first transceiver, enables a physical layer of a first transmitter of the first transceiver to receive an output of a second receiver of the second transceiver, and enables the physical layer of a second transmitter of the second transceiver to receive an output of a first receiver of the first transceiver.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

To minimize use of memory and processor power, embodiments of the present disclosure may enable entry into a relay mode to redirect a physical layer signal directly to the destination transceiver. For a half-duplex protocol, the protocol controller may still be required to detect the data bus direction. Instead of extracting an entire packet, only a subset of operations may be needed to extract bus data direction. Such information may be used to control the destination transceiver.

When the relay operation is no longer needed, embodiments of the present disclosure may cause exit of the relay mode and entry into a non-relay mode, and all or part of a communications path may be restored to normal transceiver mode (e.g., non-relay mode) and perform its intended operation.

With the data transfer scheme according to the present disclosure, it may be possible to daisy-chain multiple device controllers and communicate to the desired target device without a large latency penalty. For a custom protocol, the data transfer scheme may simply reuse the existing command structure since all communication will act like a regular one-depth data transfer. In the meantime, the data transfer scheme may avoid the need of consuming extra memory and processing power of a processor.

The systems and methods disclosed herein are not in any way limited to a particular application and may be used in various ways and in any suitable manner. For example, in some embodiments, a system controller of a communications system may be a camera system controller, and a device controller may be a lens stability controller for stabilizing a camera lens or a lens focus controller for controlling focus of a camera lens, and a device target may be a sensor for detecting a camera lens position.

Figure 1:
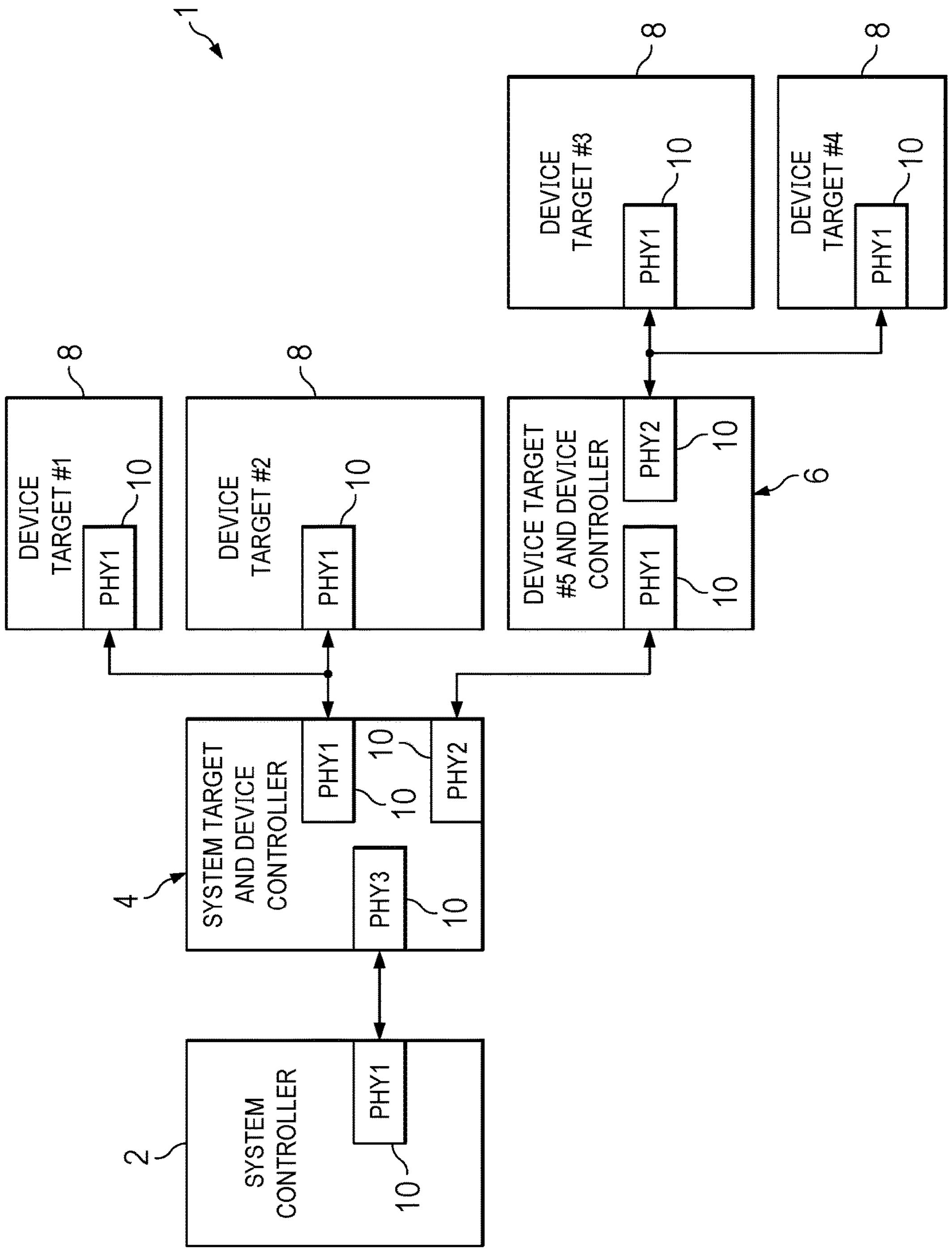
FIG. 1 (PRIOR ART)
FIG. 1 illustrates a block diagram of selected components of an example communications system, as is known in the art.
Figure 2:
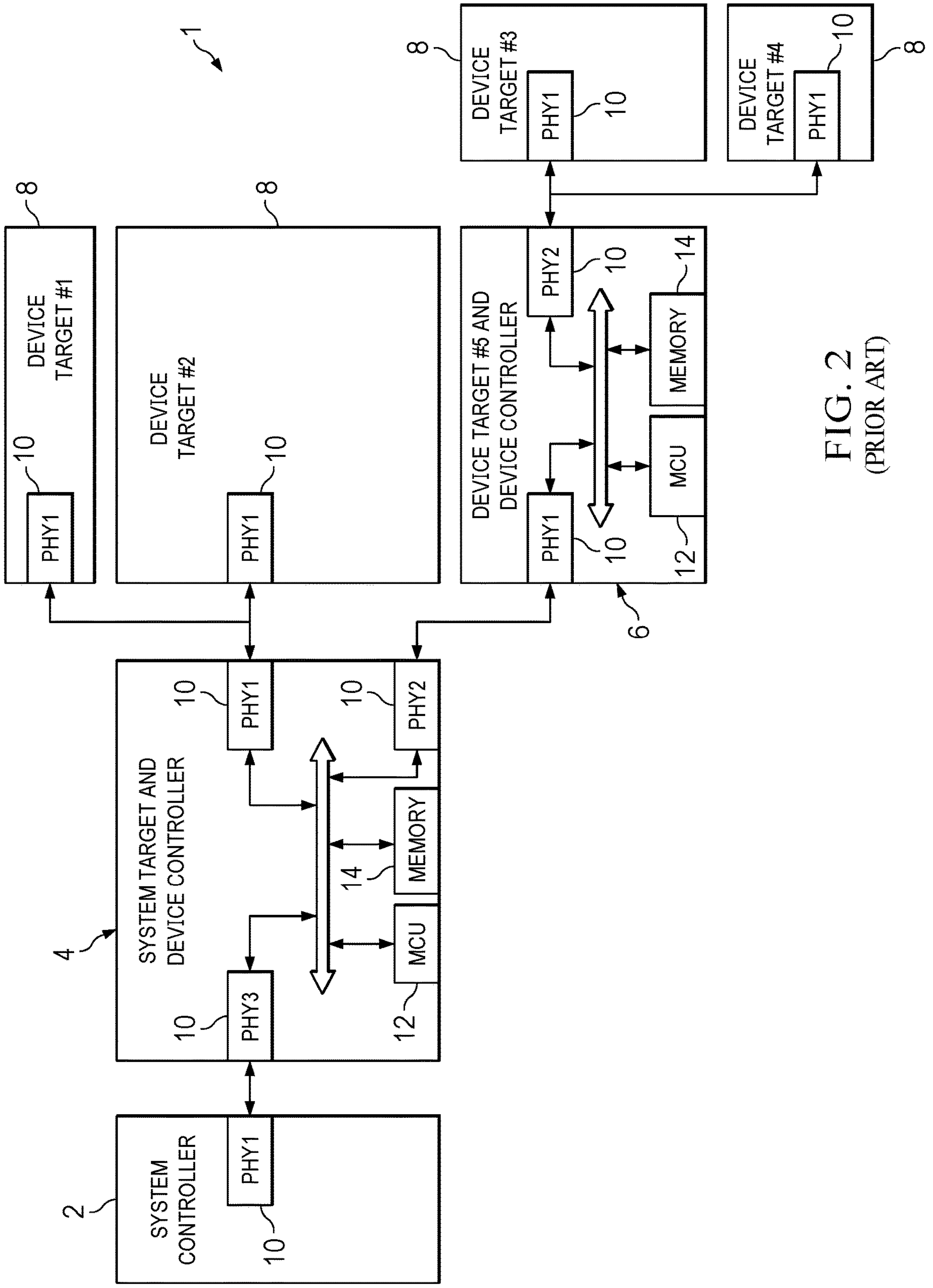
FIG. 2 (PRIOR ART)
FIG. 2 illustrates a block diagram of selected components of the example communications system of FIG. 1, as is known in the art.
Figure 3:
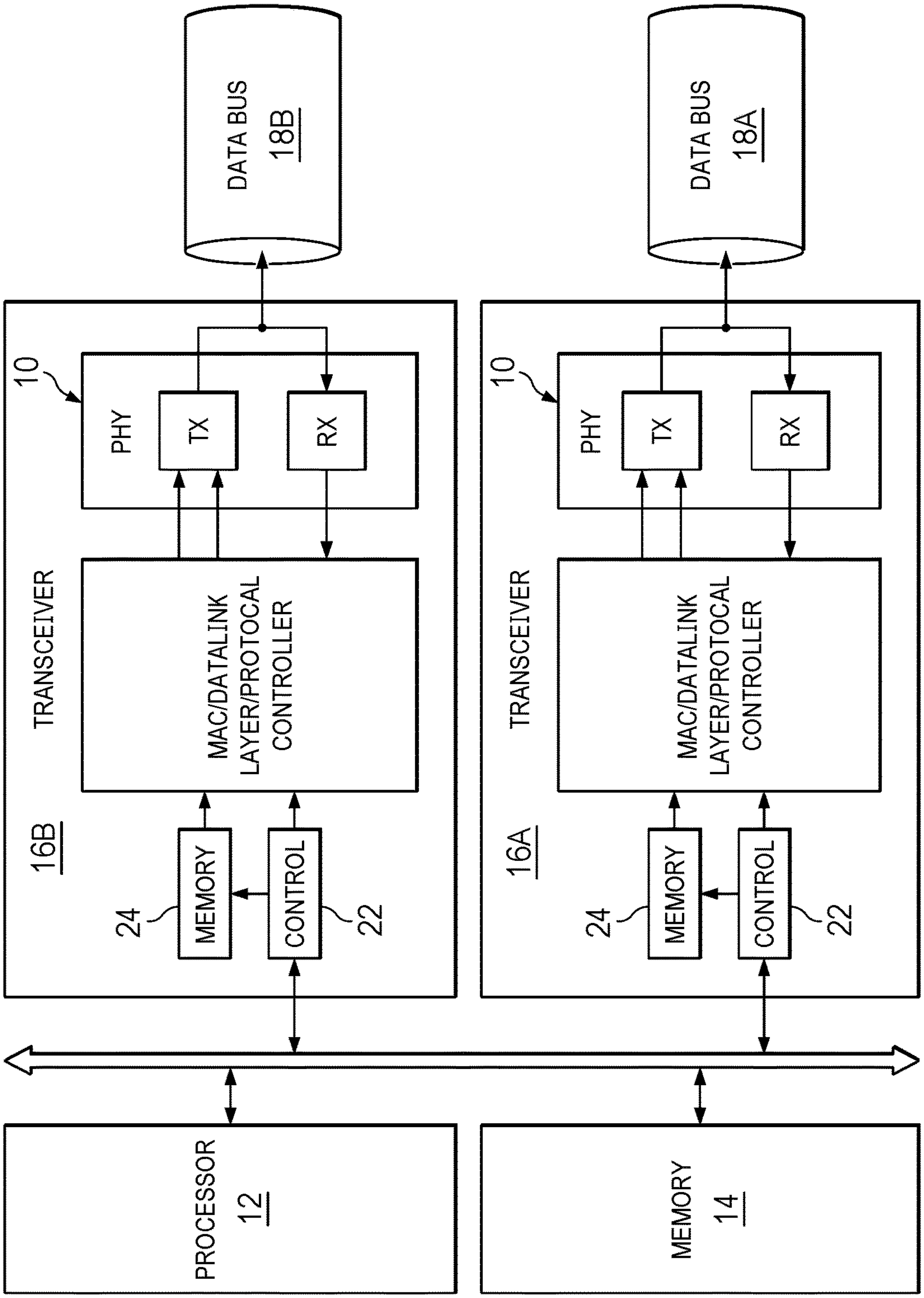
FIG. 3 (PRIOR ART)
FIG. 3 illustrates a block diagram of selected components of a device controller within the communications system of FIG. 1, as is known in the art.
Figure 4:
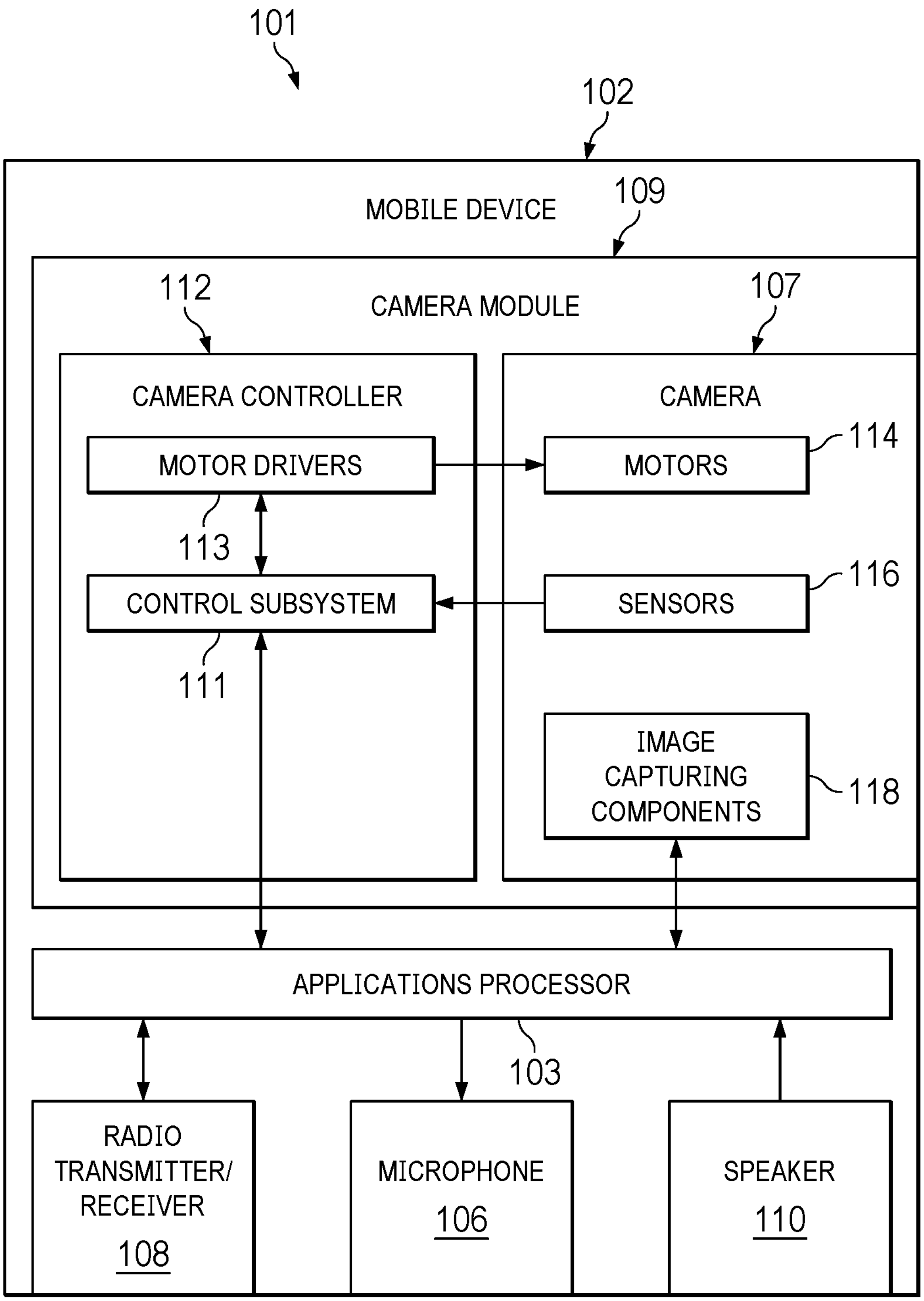
FIG. 4 illustrates a block diagram of selected components of an example mobile device, in accordance with embodiments of the present disclosure.

FIG. 4 illustrates a block diagram of selected components of an example mobile device 102, in accordance with embodiments of the present disclosure. As shown in FIG. 4, mobile device 102 may comprise an enclosure 101, an applications processor 103, a microphone 106, a radio transmitter/receiver 108, a speaker 110, and a camera module 109 comprising a camera 107 and a camera controller 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Applications processor 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (not explicitly shown) and/or other computer-readable media accessible to applications processor 103.

Microphone 106 may be housed at least partially within enclosure 101, may be communicatively coupled to applications processor 103, and may comprise any system, device, or apparatus configured to convert sound incident at microphone 106 to an electrical signal that may be processed by applications processor 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to applications processor 103, and may include any system, device, or apparatus configured to, with the aid of an antenna, generate and transmit radio-frequency signals as well as receive radio-frequency signals and convert the information carried by such received signals into a form usable by applications processor 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

Speaker 110 may be housed at least partially within enclosure 101 or may be external to enclosure 101, may be communicatively coupled to applications processor 103, and may comprise any system, device, or apparatus configured to produce sound in response to electrical audio signal input. In some embodiments, speaker 110 may comprise a dynamic loudspeaker, which employs a lightweight diaphragm mechanically coupled to a rigid frame via a flexible suspension that constrains a voice coil to move axially through a magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Camera 107 may be housed at least partially within enclosure 101 (and partially outside of enclosure 101, to enable light to enter a lens of camera 107), and may include any suitable system, device, or apparatus for recording images (moving or still) into one or more electrical signals that may be processed by applications processor 103. As shown in FIG. 4, camera 107 may include a plurality of motors 114, sensors 116, and image capturing components 118.

Image capturing components 118 may include a collection of components configured to capture an image, including without limitation one or more lenses and image sensors for sensing intensities and wavelengths of received light. Such image capturing components 118 may be coupled to applications processor 103 such that camera 107 may communicate captured images to applications processor 103.

Motors 114 may be mechanically coupled to one or more of image capturing components 118, and each motor 114 may include any suitable system, device, or apparatus configured to, based on control signals received from camera controller 112 indicative of a desired camera position, cause mechanical motion of such one or more image capturing components 118 to a desired camera position.

Sensors 116 may be mechanically coupled to one or more of image capturing components 118 and/or motors 114 and may be configured to sense a position associated with camera 107. For example, a first sensor 116 may sense a first position (e.g., x-position) of camera 107 with respect to a first linear direction, a second sensor 116 may sense a second position (e.g., y-position) of camera 107 with respect to a second linear direction normal to the first linear direction, and a third sensor 116 may sense a third position (e.g., z-position) of camera 107 (e.g., position of lens) with respect to a third linear direction normal to the first linear direction and the second linear direction.

Camera controller 112 may be housed within enclosure 101, may be communicatively coupled to camera 107 and applications processor 103 (e.g., via an Inter-Integrated Circuit (I2C) interface), and may include any system, device, or apparatus configured to control motors 114 or other components of camera 107 to place components of camera 107 into a desired position. Camera controller 112 may also be configured to receive signals from sensors 116 regarding an actual position of camera 107 and/or regarding a status of camera 107. As shown in FIG. 4, camera controller 112 may include a control subsystem 111 and motor drivers 113.

Control subsystem 111 may be integral to camera controller 112, and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, control subsystem 111 may interpret and/or execute program instructions and/or process data stored in a memory and/or other computer-readable media accessible to control subsystem 111. Specifically, control subsystem 111 may be configured to perform functionality of camera controller 112, including but not limited to control of motors 114 and receipt and processing of data from sensors 116. In some embodiments, control subsystem 111 may comprise a multicore processor.

Motor drivers 113 may comprise a plurality of circuits, each such circuit configured to receive one or more control signals from control subsystem 111 (including without limitation a signal indicative of a desired target current for a motor 114) and drive a driving signal (e.g., a current-mode signal) to a respective motor 114 in accordance with the one or more control signals in order to control operation of such respective motor 114.

Figure 5:
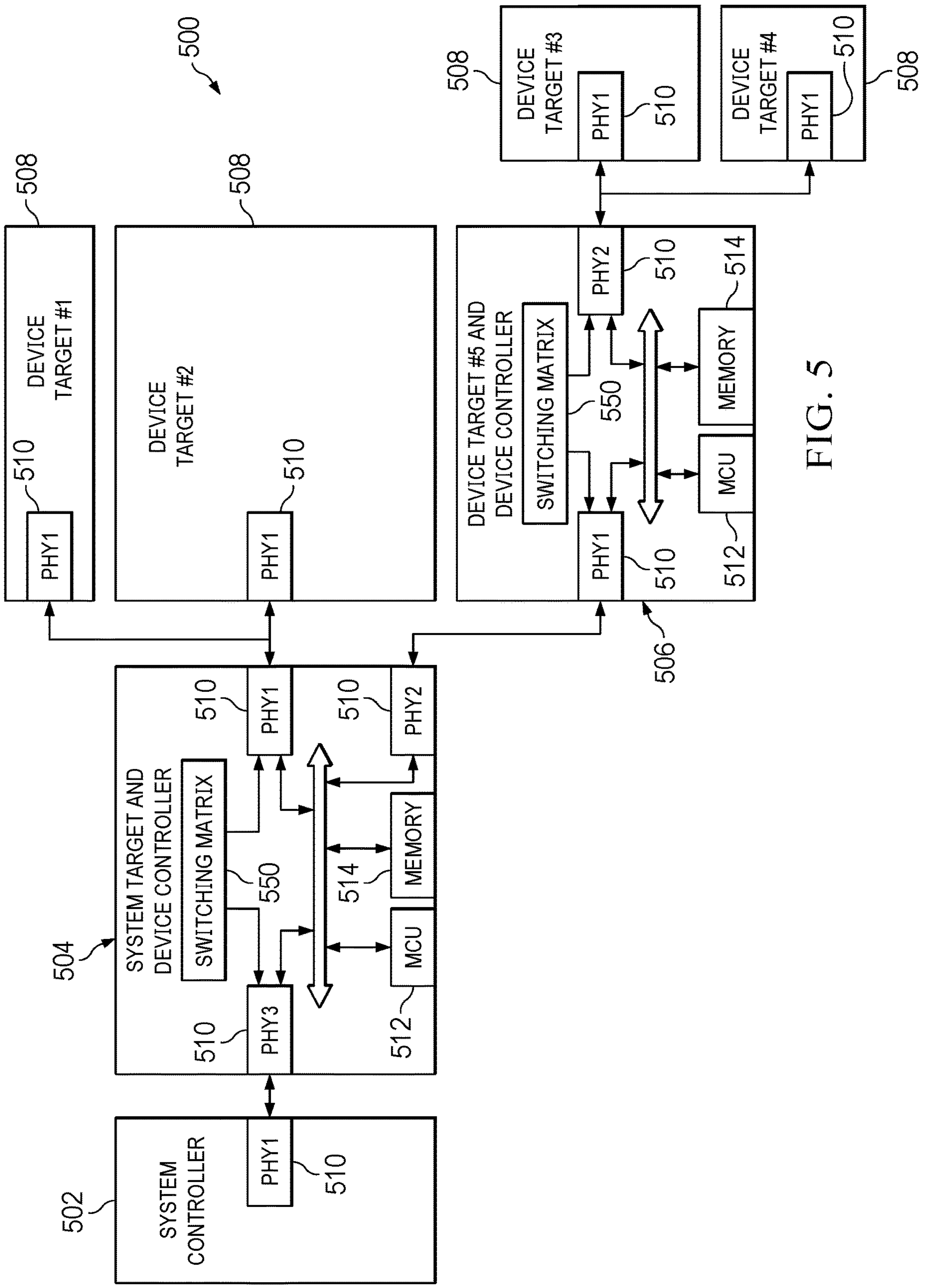
FIG. 5 illustrates a block diagram of selected components of an example communications system, in accordance with embodiments of the present disclosure.

FIG. 5 illustrates a block diagram of selected components of an example communications system 500, in accordance with embodiments of the present disclosure, in accordance with embodiments of the present disclosure. In some embodiments, communications system 500 may be used to implement all or part of control subsystem 111 of camera controller 112 and/or sensors 116. As shown in FIG. 5, communications system 500 may have a system controller 502, device controllers 504 and 506, and multiple target devices 508. As shown in FIG. 5, device controllers 504 and 506 may also be target devices. As also depicted, each of system controller 502, device controllers 504 and 506, and target devices 508 may have one or more PHYs 510. As known in the art, a PHY is an electronic circuit, usually implemented as an integrated circuit, configured to implement physical layer functions of the Open Systems Interconnection (OSI) model in a network interface controller or other device. A PHY may couple a link layer device (often called MAC as an acronym for medium access control) to a physical medium such as an optical fiber or copper cable. As shown in FIG. 5, each device controller 504 and 506 may have a processor 512 (depicted as a microcontroller unit or "MCU"), a memory 514, and a switching matrix 550.

Figure 6:
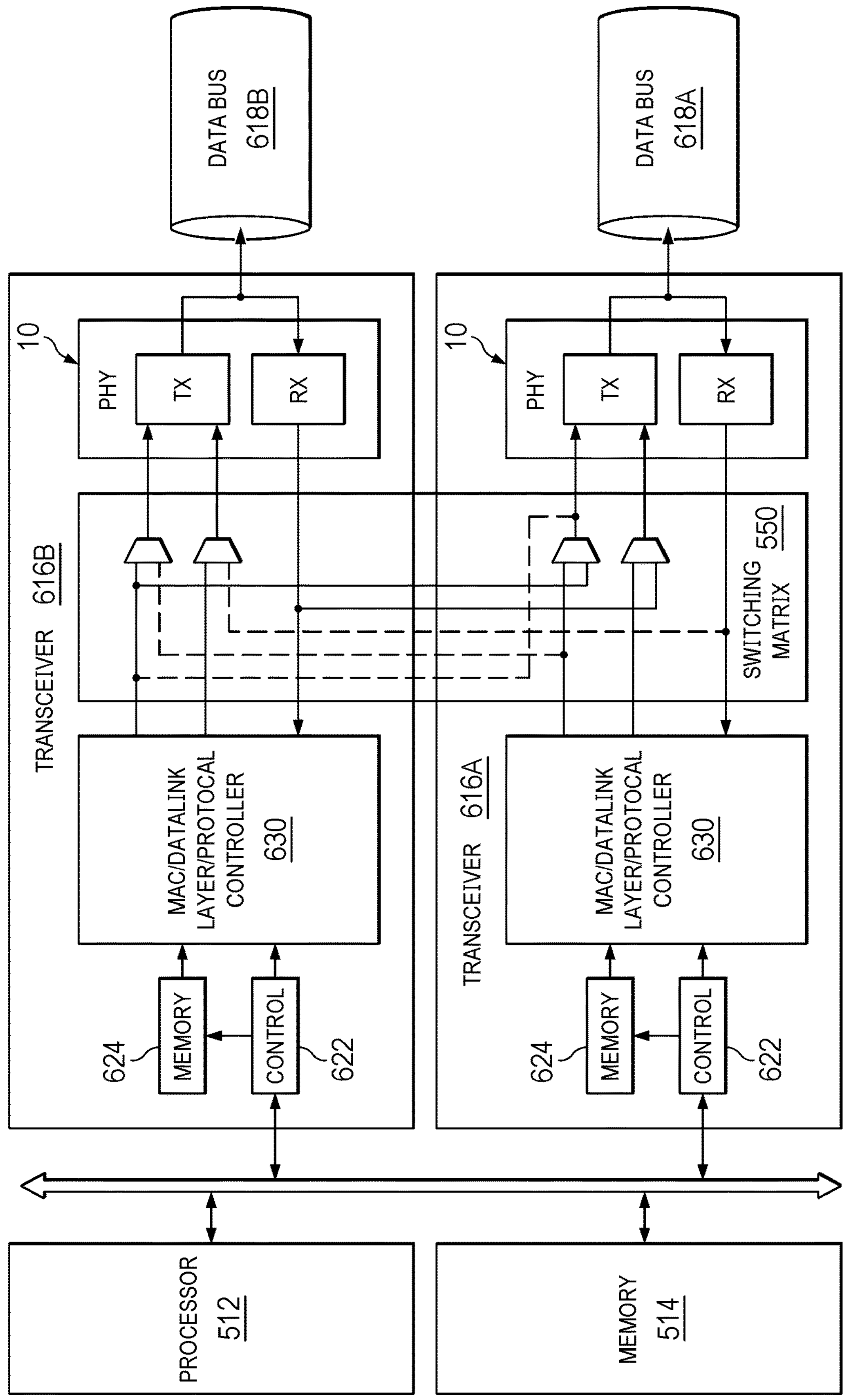
FIG. 6 illustrates a block diagram of selected components of a device controller within the communications system of FIG. 5, in accordance with embodiments of the present disclosure.

FIG. 6 illustrates a block diagram of selected components of a device controller 4 or 6, in accordance with embodiments of the present disclosure.

In operation, device controllers 504 and 506 may operate in a plurality of modes including at least a non-relay mode and a relay mode. In the non-relay mode, each transceiver 616 of a device controller 4 and 6 may operate independently and may receive and transmit data a particular application requires.

However, during the relay mode, system controller 502 may instruct first device controller 504 to enable the relay mode, and first device controller 504 may in turn instruct second device controller 506 to enable the relay mode. When the relay mode is enabled in a device controller 504 or 506, such device controller 504 or 506 may configure its switching matrix 550 to couple physical layers of transceivers 618 of the device controller 504 or 506 to one another. Accordingly, after the relay configuration is complete, system controller 502 may begin communication of data to its final destination target device 508 as if such target device 508 was a single-layer target.

In a device controller 504 or 506 during the relay mode, output data from a receiver RX of transceiver 616A may couple to transmitter TX of transceiver 616B in the physical layer. Likewise, output data from a receiver RX of transceiver 616B may couple to transmitter TX of transceiver 616A in the physical layer.

Protocol controllers 630 (labeled as "MAC/Datalink Layer/Protocol Controllers" in FIG. 6) may observe respective bus conditions. For example, protocol controller 630 of transceiver 616A may observe data bus 618A and observe a condition of data bus 618A. Protocol controller 630 of transceiver 616A may provide control signals to transceiver 618B in order to cause data bus 618B to mimic data bus 618A. For example, when no device is driving data bus 618A during the relay mode, protocol controller 630 of transceiver 616A may instruct transmitter TX of transceiver 616B not to drive data bus 618B. Similarly, protocol controller 630 of transceiver 616B may provide control signals to transceiver 616A in order to cause data bus 618A to mimic data bus 618B. For example, when no device is driving data bus 618B during the relay mode, protocol controller 630 of transceiver 616B may instruct transmitter TX of transceiver 616A not to drive data bus 618A.

During the relay mode, all transceivers 616 involved in the relay operation may act in concert to cause data bus 618A and data bus 618B to match identical condition. Further during the relay mode, all transceivers 616 involved in the relay operation may be configured to receive data and identify any commands or data required to maintain the relay operation. However, transceivers 616 involved in the relay operation may not need to respond to all of the communications packets.

When the relaying mode is no longer desired, system controller 502 may send a command to instruct all device controllers 504 and 506 to restore their respective switch matrices 550 from the relay mode to a normal operation mode (e.g., non-relay mode).

Embodiments of the present disclosure may provide systems and methods of relaying a message for a PHY/data link level communication protocol. The system may comprise a first device having first and second transceivers and a switching matrix coupled to the first and second transceivers. The first transceiver may have a first protocol controller, and the second transceiver may have a second protocol controller. The first protocol controller may detect a first bus condition, and the second protocol controller may detect a second bus condition.

In a relaying mode, the switching matrix may switch so that the first protocol controller controls the physical layer of the second transceiver and the second protocol controller controls the physical layer of the first transceiver. Also in the relaying mode, the switching matrix may switch so that the physical layer of a transmitter of the first transceiver may receive an output of a receiver of the second transceiver; and the switching matrix may switch so that the physical layer of a transmitter of the second transceiver may receive an output of a receiver of the first transceiver.

In a non-relaying mode or normal operation mode, the switching matrix may switch so that the first protocol controller may control the physical layer of the first transceiver, and the second protocol controller may control the physical layer of the second transceiver. Also in the non-relaying mode, the switching matrix may switch so that the physical layer of a transmitter of the first transceiver may receive an output of the first protocol controller, and the switching matrix may switch so that the physical layer of a transmitter of the second transceiver will receive an output of the second protocol controller.

One or more second devices may be coupled to the first device in a daisy-chain manner so that messages and/or data may be relayed from the first device to the one or more second devices.

Furthermore, embodiments of the present disclosure may provide a network relay in a network with at least one or more device controller and at least two or more transceivers of the same type. Each transceiver may be capable of re-transmitting received information.

Each transceiver may have a protocol controller which may detect a bus condition and may control the physical layer control signal and a switching matrix which may allow the electrical signals to/from the physical layer to be redirected to the same and another transceiver's physical layer and may allow the electrical control signal to any transceiver's physical layer to be connected to the switching matrix. In a non-relay mode, each transceiver may operate as a normal transceiver and may operate independently.

In a relay mode, the switching matrix may configure the receiving and relay transceiver to allow the control and data signal to store the correct configuration. In the relay mode, system memory may no longer be required to store an incoming data packet to a processor and a control system outside the transceiver is no longer required to process the incoming data packet when relaying the incoming data packet.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for relaying communication for a PHY/data link level communication protocol, comprising:

a first device having a processor, a first transceiver coupled to the processor, and a second transceiver coupled to the processor, wherein the first transceiver has a first protocol controller configured to detect a condition of a first bus and the second transceiver has a second protocol controller configured to detect a condition of a second bus; and a switching matrix coupled to the first transceiver and the second transceiver and configured to operate in a plurality of modes including at least a relaying mode in which the switching matrix:

enables the first protocol controller to control a physical layer of the second transceiver and enables the second protocol controller to control a physical layer of the first transceiver;

enables a first transmitter of the physical layer of the first transceiver to receive an output of a second receiver of the physical layer of the second transceiver; and enables a second transmitter of the physical layer of the second transceiver to receive an output of a first receiver of the physical layer of the first transceiver;

wherein, when the first transceiver and the second transceiver are operating in the relaying mode, the first device is configured not to process or store data packets received via the first transceiver or the second transceiver in a location that is external to the first transceiver and external to the second transceiver; and wherein the first protocol controller of the first transceiver provides control signals to the second transceiver to cause the second data bus to mimic the first data bus.

2. The system of claim 1, the plurality of modes further comprising a non-relaying mode in which the switching matrix:

enables the first protocol controller to control the physical layer of the first transceiver and the second protocol controller to control the physical layer of the second transceiver;

enables the first transmitter of the first transceiver to receive the output of the first protocol controller; and enables the second transmitter of the second transceiver to receive the output of the second protocol controller.

3. The system of claim 1, further comprising a second device coupled to the first device in a daisy-chain architecture so that in the relaying mode, communications are enabled for transmission from the first device to the second device.

4. The system of claim 1, wherein the system is a camera controller and the first transceiver is integral to a lens stability controller.

5. The system of claim 1, wherein the system is a camera controller and the first transceiver is integral to a lens focus controller.

6. The system of claim 1, wherein the system is a camera controller and the second transceiver is integral to a sensor.

7. A method for relaying communication for a PHY/data link level communication protocol, comprising:

operating a switching matrix coupled to a first transceiver and a second transceiver of a first device in a plurality of modes, wherein the first device includes a processor coupled to the first transceiver and coupled to the second transceiver, wherein the plurality of modes includes at least a relaying mode in which the switching matrix:

enables a first protocol controller, which is configured to detect a condition of a first bus, to control a physical layer of the second transceiver and enables a second protocol controller, which is configured to detect a condition of a second bus, to control a physical layer of the first transceiver;

enables a first transmitter of the physical layer of the first transceiver to receive an output of a second receiver of the physical layer of the second transceiver; and enables a second transmitter of the physical layer of the second transceiver to receive an output of a first receiver of the physical layer of the first transceiver;

wherein, when the first transceiver and the second transceiver are operating in the relaying mode, the first device does not process or store data packets received via the first transceiver or the second transceiver in a location that is external to the first transceiver and external to the second transceiver; and wherein the first protocol controller of the first transceiver provides control signals to the second transceiver to cause the second bus to mimic the first bus.

8. The method of claim 7, the plurality of modes further comprising a non-relaying mode in which the switching matrix:

enables the first protocol controller to control the physical layer of the first transceiver and the second protocol controller to control the physical layer of the second transceiver;

enables the first transmitter of the first transceiver to receive the output of the first protocol controller; and enables the second transmitter of the second transceiver to receive the output of the second protocol controller.

9. The method of claim 7, wherein a second device is coupled to the first device in a daisy-chain architecture so that in the relaying mode, communications are enabled for transmission from the first device to the second device.

10. The method of claim 7, wherein the first transceiver is integral to a lens stability controller of a camera controller.

11. The method of claim 7, wherein the first transceiver is integral to a lens focus controller of a camera controller.

12. The method of claim 7, wherein the second transceiver is integral to a sensor of a camera controller.

* * * * *